United States Patent

Zeiler

[11] 3,923,851
[45] Dec. 2, 1975

[54] PREPARATION OF SUBSTITUTED ISOTHIOCYANATES

[75] Inventor: Andrew G. Zeiler, Muskegon, Mich.

[73] Assignee: Story Chemical Corporation, Muskegon, Mich.

[22] Filed: Jan. 14, 1974

[21] Appl. No.: 433,048

[52] U.S. Cl. .................................................. 260/454
[51] Int. Cl.² ....................................... C07C 161/04
[58] Field of Search ............. 260/454, 687; 252/472

[56] References Cited
UNITED STATES PATENTS

| | | | |
|---|---|---|---|
| 1,540,448 | 6/1925 | Wilson | 252/472 |
| 3,404,171 | 10/1968 | Ulrich | 260/454 |
| 3,794,642 | 2/1974 | Kress | 260/687 |

FOREIGN PATENTS OR APPLICATIONS

| | | | |
|---|---|---|---|
| 1,024,913 | 4/1966 | United Kingdom | 260/454 |
| 581,338 | 8/1959 | Canada | 260/454 |

OTHER PUBLICATIONS

Hartman et al., "Removal of Sulfur Dioxide from Flue Gas etc" (1971) Ca 75 No. 154707 W. (1971).

*Primary Examiner*—Glennon H. Hollrah
*Attorney, Agent, or Firm*—Cooper, Dunham, Clark, Griffin & Moran

[57] ABSTRACT

Substituted isothiocyanates, such as alkyl isothiocyanates, e.g. ethyl isothiocyanate, are prepared by reacting an amine, such as a primary amine, and carbon disulfide with gaseous oxygen and desirably in the presence of a catalyst to produce a substituted isothiocyanate, such as ethyl isothiocyanate when ethylamine is employed in the reaction. An embodiment of the invention is indicated by the chemical equation:

$$C_2H_5NH_2 + CS_2 \xrightarrow[CCl_4]{O_2/C} C_2H_5NCS + S + H_2O$$

In the above indicated chemical equation activated carbon C is employed as the oxidation catalyst and the reaction is carried out in the presence of a solvent, such as carbon tetrachloride.

8 Claims, No Drawings

PREPARATION OF SUBSTITUTED ISOTHIOCYANATES

This invention relates to the preparation of substituted isothiocyanates. It is known to prepare substituted isothiocyanates, see U.S. Pat. Nos. 2,595,723, 2,762,826, 2,859,235, 2,859,236, 2,886,584, 2,894,013, 3,322,810, 3,404,171, 3,406,191, and 3,412,098, see also *Indian Journal of Chemistry* (1970), page 759, the article by G. S. Johar, V. Agarwala and R. P. Bhaskara. The disclosures of each of the above-identified patents and the publication are herein incorporated and made part of this disclosure.

The invention disclosed and claimed in this application is related to the invention disclosed and claimed in my copending, coassigned application Ser. No. 433,049 filed Jan. 14, 1974 which is directed to an aqueous system for the preparation of substitued isothiocyanates.

It is an object of this invention to provide a process for the preparation of substituted isothiocyanates.

Another object of this invention is to provide a direct and economical method for the preparation of substituted isothiocyanates.

How these and other objects of this invention are accomplished will become apparent in the light of the accompanying disclosure. In at least one embodiment of the practice of this invention at least one of the foregoing objects will be achieved.

It has been discovered that substituted isothiocyanates are prepared by reacting an amine, such as a primary amine, and carbon disulfide with gaseous oxygen, preferably in the presence of an oxidation catalyst. The reaction is carried out in the presence of a non-aqueous solvent for the reaction. Upon contact of the reaction admixture comprising the amine and carbon disulfide with gaseous oxygen the corresponding substituted isothiocyanate is formed together with elemental sulfur and water. The practice of the invention is illustrated in one embodiment in the accompanying equation:

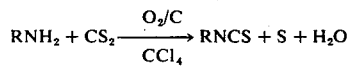

$$RNH_2 + CS_2 \xrightarrow[CCl_4]{O_2/C} RNCS + S + H_2O$$

As indicated, gaseous oxygen reacts with the reaction admixture of the amine and carbon disulfide in the presence of activated carbon C as a catalyst in the presence of a carrier or solvent, such as a water immiscible solvent having a boiling point different from that of the product isothiocyanate, e.g. a halogenated hydrocarbon or an aromatic hydrocarbon, such as benzene and carbon tetrachloride, to produce the substituted isothiocyanate RNCS together with elemental sulfur and water.

In the formation of the reaction admixture comprising the amine and carbon disulfide the amine might be added to the carbon disulfide to form the reaction admixture or the carbon disulfide might be added to the amine. The addition of one of the reactants is carried out over a suitable period of time, such as about an hour, more or less, with control of the temperature of the reaction, such as by external cooling, to maintain the temperature of the reaction admixture at a temperature in the range from about 5°C. to about 30°C., more or less, such as in the range 10°–20°C. or 20°–25°C.

Upon completion of the addition of the reactants to form the reaction admixture comprising the amine, carbon disulfide and a solvent, such as a water-immiscible halogenated hydrocarbon solvent, e.g. chloroform or carbon tetrachloride, an oxidation catalyst, such as activated carbon, is added to the reaction admixture. Thereupon, gaseous oxygen, either in the form of substantially pure oxygen or air, is introduced into the reaction admixture for a period of time, such as up to about 6 hours, more or less, while maintaining the temperature of the resulting reaction admixture at a temperature in the range from about 10°C. to about 30°C., more or less, such as a temperature in the range 15°–20°C. or 25°–30°C.

The resulting reaction admixture is then filtered to separate any suspended solids (sulfur) therefrom formed during the reaction and filtrate evaporated for solvent removal and for the recovery of substituted isothiocyanate.

The following examples are illustrative of the practices of this invention. As set forth in each of the accompanying examples a primary amine $RNH_2$, such as a primary aliphatic or alkyl amine or a primary cycloaliphatic or cycloalkyl amine, is admixed with carbon disulfide to form a reaction admixture which is then reacted in the presence of an oxidation catalyst, such as activated carbon, with gaseous oxygen to yield the corresponding substituted isothiocyanate.

EXAMPLE NO. 1

Preparation of n-propylisothiocyanate

To a solution of 38 grams (0.5 mol) of carbon disulfide in 150 ml of chloroform were added 29.5 grams (0.5 mol) of n-propylamine over a period of one hour while maintaining the temperature of the resulting mixture at 10°–20°C. To the resulting mixture were added 5 grams of activated carbon and the resulting reaction mixture was oxygenated for a period of 1.5 hour. The reaction temperature was maintained at 10°–20°C. throughout the oxygenation. The resulting reaction admixture was filtered to remove the carbon catalyst and precipitated sulfur. The filtrate yielded 41.2 grams (81.6% yield) of n-propylisothiocyanate.

EXAMPLE NO. 2

Preparation of n-butylisothiocyanate

To a solution of 38 grams (0.5 mol) of carbon disulfide in 200 ml of CCL4 were added 36.5 grams (0.5 mol) of n-butylamine over a period of 1 hour while maintaining the temperature at 15°–20°C. To the resulting mixture were added 5 grams of activated carbon and oxygen was passed into the reaction mixture at a rate of 150 ml/min for a period of 1 hour. The reaction temperature was kept at 15°–20°C. during the oxygenation. The resulting reaction admixture was filtered and the filtrate was distilled to yield 42.2 grams (73.5% yield) of n-butylisothiocyanate.

EXAMPLE NO. 3

Preparation of Cyclohexylisothiocyanate

To a solution of 38 grams (0.5 mol) of carbon disulfide in 200 ml of CCl4 were added 49.6 grams (0.5 mol) of cyclohexylamine at a temperature in the range 20°–25°C. over a period of 1 hour. To the resulting mixture were added 5 grams of activated carbon and oxygen was then passed into the mixture at 150 ml/min for a period of 2 hours. The reaction temperature during oxygen addition was maintained at 25°–30°C. with cooling. The carbon and precipitated sulfur were filtered off and the filtrate was distilled to yield 48.5 grams (69% yield) of cyclohexylisothiocyanate.

EXAMPLE NO. 4

Preparation of Octadecylisothiocyanate

To a solution of 26.9 grams (0.1 mol) of octadecylamine in 200 ml of chloroform were added 8.8 grams (0.115 mol) of carbon disulfide. To the resulting mixture were added 5 grams of activated carbon and the mixture warmed to 30°C. Oxygen was then passed into the mixture at 150 ml/min for one hour. The reaction was exothermic and cooling was required to maintain the temperature at 25°–30°C. The resulting reaction admixture was filtered and the solvent was distilled under reduced pressure. The residue was stirred with 100 ml of toluene, the sulfur filtered off and the toluene distilled at reduced pressure to yield 25.5 grams (82% yield) of crude octadecylisothiocyanate as a viscous oil.

In the practices of this invention as set forth in the foregoing examples, enphasis has been placed upon the use of primary aliphatic amines, such as $C_1$-$C_{30}$ primary alkylamines for the preparation of the substituted isothiocyanates. In addition to the aliphatic amines the cycloaliphatic amines, particularly the cycloalkylamines, are also useful for the preparation of substituted isothiocyanates in accordance with the invention. Suitable cycloalkylamines include the $C_5$-$C_{20}$ cycloalkylamines, such as cyclopentylamine, cycloheptylamine, cyclooctylamine, cyclononylamine, cyclodecylamine, cycloundecylamine and cyclododecylamine.

In general, the primary hydrocarbyl amines, i.e. amines made up of only hydrogen, carbon and nitrogen atoms, wherein only hydrogen and carbon atoms make up the substituent amine group, are especially useful in the preparation of the substituted isothiocyanates in accordance with this invention. Additionally, the substituted alkyl primary amines, such as are exemplified by the formula $X-(CH_2)_n-NH_2$ wherein $X$ = aryl, halogen, OH and OR substituents, wherein $n$ = an integer in the range 1–20 and R is an alkyl group in the range $C_1$-$C_{20}$, are also useful.

Desirably, as indicated in the foregoing disclosure, it is preferred to form the reaction admixture comprising the amine, carbon disulfide, solvent and oxygenation catalyst (e.g. activated carbon) at a temperature below 30°C. and to carry out the oxidation of the resulting reaction admixture with gaseous oxygen also at a temperature below about 30°C. If desired, however, higher temperatures might be employed. Also, as indicated in the accompanying disclosure, it is preferred to carry out the reaction at atmospheric or ambient pressure. If desired, however, higher pressures, such as up to about 10 atmospheres pressure or higher and lower than atmospheric pressures, such as a pressure as low as about 0.1 atmosphere, or lower, might also be usefully employed.

As indicated hereinabove, it is preferred to employ a relatively low boiling point organic solvent in the preparation of the reaction admixture. The water-immiscible low molecular weight halogenated hydrocarbons, such as the $C_1$-$C_2$ halogenated hydrocarbons, e.g. chloroform, carbon tetrachloride, methylene chloride and mixtures thereof, are useful as solvents.

As will be apparent to those skilled in the art in the light of the foregoing disclosure, many modifications, alterations and substitutions are possible in the practice of this invention without departing from the spirit or scope thereof.

I claim:

1. A method for the preparation of a substituted isothiocyanate which comprises contacting a reaction admixture formed from and consisting essentially of a $C_1$-$C_{30}$ alkyl or cycloalkyl primary amine, carbon disulfide and a non-aqueous, low molecular weight, waterimmiscible halogenated hydrocarbon or an aromatic hydrocarbon as a solvent for the substituted isothiocyanate with gaseous oxygen in the presence of activated carbon as an oxidation catalyst and at a temperature in the range 5°–30°C. and recovering from the resulting reaction admixture a substituted isothiocyanate.

2. A method in accordance with claim 1 wherein the reaction admixture is formed by adding the amine to said carbon disulfide, followed by contacting the resulting admixture with gaseous oxygen in the presence of the activated carbon.

3. A method in accordance with claim 1 wherein the reaction admixture is formed by adding the carbon disulfide to the amine, followed by contacting the resulting admixture with gaseous oxygen in the presence of the activated carbon.

4. A method in accordance with claim 1 wherein said amine is cyclohexylamine.

5. A method in accordance with claim 1 wherein said amine is n-propylamine.

6. A method in accordance with claim 1 wherein said amine is n-butylamine.

7. A method in accordance with claim 1 wherein said amine is octadecylamine.

8. A method in accordance with claim 1 wherein said halogenated hydrocarbon is selected from the group consisting of chloroform, methylene chloride and carbon tetrachloride.

* * * * *